US012241810B2

(12) United States Patent
West et al.

(10) Patent No.: US 12,241,810 B2
(45) Date of Patent: Mar. 4, 2025

(54) SENSOR ASSEMBLY

(71) Applicant: Therm-O-Disc, Incorporated, Mansfield, OH (US)

(72) Inventors: Jeffrey A. West, Bellville, OH (US); Gabriel Alfred Edde, Washington Township, OH (US)

(73) Assignee: Therm-O-Disc, Incorporated, Mansfield, OH (US)

(*) Notice: Subject to any disclaimer, the term of this patent is extended or adjusted under 35 U.S.C. 154(b) by 464 days.

(21) Appl. No.: 17/849,010

(22) Filed: Jun. 24, 2022

(65) Prior Publication Data

US 2023/0003601 A1   Jan. 5, 2023

Related U.S. Application Data

(60) Provisional application No. 63/216,745, filed on Jun. 30, 2021.

(51) Int. Cl.
| | | |
|---|---|---|
| *G01M 3/00* | (2006.01) | |
| *F24F 11/63* | (2018.01) | |
| *F24F 11/89* | (2018.01) | |
| *G01K 1/08* | (2021.01) | |
| *G01M 3/04* | (2006.01) | |
| *F24F 110/10* | (2018.01) | |

(52) U.S. Cl.
CPC ............. *G01M 3/002* (2013.01); *F24F 11/63* (2018.01); *F24F 11/89* (2018.01); *G01K 1/08* (2013.01); *G01M 3/04* (2013.01); *F24F 2110/10* (2018.01)

(58) Field of Classification Search
CPC .......... G01M 3/002; G01M 3/04; F24F 11/63; F24F 11/89; F24F 2110/10; G01K 1/08
See application file for complete search history.

(56) References Cited

U.S. PATENT DOCUMENTS

| | | | | |
|---|---|---|---|---|
| 4,818,363 | A * | 4/1989 | Bayha ................... | G01N 27/407 204/426 |
| 5,396,796 | A * | 3/1995 | Kotani ................. | G01N 27/121 73/431 |
| 6,564,563 | B2 * | 5/2003 | Goth .................. | H05K 7/20381 62/157 |

(Continued)

FOREIGN PATENT DOCUMENTS

| | | |
|---|---|---|
| CN | 104089383 A | 10/2014 |
| CN | 204807165 U | 11/2015 |

(Continued)

OTHER PUBLICATIONS

International Search Report and Written Opinion of the ISA for PCT/US2022/035090, ISA/EPO, mailed Oct. 14, 2022.

(Continued)

*Primary Examiner* — Nathaniel T Woodward
*Assistant Examiner* — Philip L Cotey
(74) *Attorney, Agent, or Firm* — Harness, Dickey & Pierce, P.L.C.

(57) ABSTRACT

A sensor assembly includes a controller, a sensor, and a housing. The housing encloses the controller and sensor and includes a body supporting the controller and a head supporting the sensor. The body prevents exposure of the controller to an external environment, and the head includes slots enabling exposure of the sensor to the external environment.

11 Claims, 9 Drawing Sheets

(56) References Cited

U.S. PATENT DOCUMENTS

| | | | | |
|---|---|---|---|---|
| 6,644,047 B2* | 11/2003 | Taira | ................ | F24F 11/89 62/181 |
| 6,644,056 B2* | 11/2003 | Goth | ................ | H05K 7/20381 62/126 |
| 7,395,173 B2* | 7/2008 | Kautz | ................ | G01K 7/42 374/E7.042 |
| 7,814,757 B2* | 10/2010 | Zima | ................ | F25B 49/005 62/149 |
| 10,041,818 B2* | 8/2018 | Graff | ................ | G01K 1/08 |
| 10,488,065 B2* | 11/2019 | Chen | ................ | G01M 3/228 |
| 10,724,976 B2* | 7/2020 | Rogers | ................ | G01N 29/036 |
| 2003/0000232 A1* | 1/2003 | Goth | ................ | H05K 7/20381 62/125 |
| 2003/0005711 A1* | 1/2003 | Goth | ................ | H05K 7/20381 62/176.1 |
| 2003/0150225 A1* | 8/2003 | Goth | ................ | H05K 7/20381 62/157 |
| 2003/0235516 A1* | 12/2003 | Osawa | ................ | G01N 33/0027 422/98 |
| 2008/0107151 A1* | 5/2008 | Khadkikar | ................ | G01F 23/22 374/141 |
| 2009/0141433 A1* | 6/2009 | Maloney | ................ | G01D 11/24 361/679.01 |
| 2010/0305859 A1* | 12/2010 | Fogarty | ................ | G01W 1/06 374/E1.001 |
| 2012/0304752 A1* | 12/2012 | Krommenhoek | ................ | G01L 19/14 73/114.76 |
| 2014/0076026 A1* | 3/2014 | Starling | ................ | G01N 27/00 73/29.02 |
| 2016/0091241 A1* | 3/2016 | Suzuki | ................ | F24F 11/84 62/186 |
| 2016/0178229 A1* | 6/2016 | Chen | ................ | F24F 11/30 62/126 |
| 2016/0265798 A1* | 9/2016 | Havard, Jr. | ................ | F25B 49/00 |
| 2017/0314805 A1* | 11/2017 | Ikawa | ................ | F25B 49/02 |
| 2018/0195924 A1* | 7/2018 | Patch | ................ | G01L 19/147 |
| 2018/0313591 A1* | 11/2018 | Obara | ................ | F24F 13/20 |
| 2019/0170604 A1* | 6/2019 | Kester | ................ | G01M 3/226 |
| 2023/0176007 A1 | 6/2023 | West et al. | | |

FOREIGN PATENT DOCUMENTS

| | | |
|---|---|---|
| CN | 106016450 A | 10/2016 |
| EP | 3159633 B1 | 8/2019 |
| EP | 3607250 A1 | 2/2020 |
| JP | H09274003 A | 10/1997 |
| JP | 2009186424 A | 8/2009 |
| JP | 2016090109 A | 5/2016 |
| JP | 2019052785 A | 4/2019 |
| JP | 6614389 B1 | 12/2019 |
| WO | 2013038704 A1 | 3/2013 |
| WO | 2015029094 A1 | 3/2015 |
| WO | 2016046960 A1 | 3/2016 |
| WO | 2016103785 A1 | 6/2016 |
| WO | 2017002213 A1 | 1/2017 |
| WO | 2017002215 A1 | 1/2017 |
| WO | 2018198165 A1 | 11/2018 |
| WO | 2019016959 A1 | 1/2019 |
| WO | 2019030796 A1 | 2/2019 |
| WO | 2019097607 A1 | 5/2019 |
| WO | 2019138533 A1 | 7/2019 |
| WO | 2019162993 A1 | 8/2019 |
| WO | 2019234902 A1 | 12/2019 |

OTHER PUBLICATIONS

International Search Report and Written Opinion of the ISA for PCT/US2022/035103, Isa/Epo, mailed Jan. 9, 2023.

* cited by examiner

SENSOR ASSEMBLY

CROSS-REFERENCE TO RELATED APPLICATION

This application claims the benefit of U.S. Provisional Application No. 63/216,745, filed on Jun. 30, 2021. The entire disclosure of the above application is incorporated herein by reference.

TECHNICAL FIELD

The invention set forth in the appended claims relates generally to air conditioning systems and more particularly, but without limitation, to leak detection systems and sensors for use in air conditioning systems.

BACKGROUND

Hydrocarbon-based refrigerants have been used as working fluids in the heat pump and refrigeration cycle of conventional air conditioning and refrigeration systems. Fluorocarbons, such as chlorofluorocarbons (CFC), hydrochlorofluorocarbons (HCFC) and hydrofluorocarbons (HFC) became commonplace in air conditioning and refrigeration systems in the 20th century due to their favorable thermodynamic properties, their non-flammability, and their non-toxicity. However, while the inert nature of many CFCs and HCFCs made them preferred choices for use as refrigerants in air conditioning and refrigeration systems for many years, that same inert nature contributed to their long lifecycles in the atmosphere. After the discovery of ozone holes in the stratosphere over the polar regions in the early 1980s, air conditioning and refrigeration systems transitioned to hydrofluorocarbon (HFC) refrigerants which were not ozone depleting, such as R-134a, R-143a, and R-410A. In the early 21st century, new refrigerants were developed to be even safer for the environment. These new refrigerants are commonly referred to as lower global warming potential (GWP) refrigerants.

The American Society of Heating, Refrigeration, and Air Conditioning Engineers (ASHRAE) has promulgated standards classifying various refrigerants according to their toxicity and flammability. For example, ASHRAE Standard 34 classifies refrigerants having a lower toxicity as Class A refrigerants, and refrigerants having a higher toxicity as Class B refrigerants. The flammability class of refrigerants is determined according to ASTM E681, Standard Test Method for Concentration Limits of Flammability of Chemicals (Vapors and Gases) at a temperature of 60° C. and a pressure of 101 kPa. According to ASHRAE Standard 34, Class 1 refrigerants do not propagate a flame, Class 2L refrigerants have a lower flammability and a slow flame propagation (for example, a burning velocity less than 10 cm/s), Class 2 refrigerants have lower flammability and faster flame propagation (for example, a burning velocity of greater than 10 cm/s), while Class 3 refrigerants have a higher flammability and faster flame propagation (for example, a burning velocity greater than 10 cm/s). Under the ASHRAE Standard 34, the commonly used R-410A refrigerant has a Class A toxicity classification and a Class 1 flammability classification. Thus, R-410A is referred to as an A1 refrigerant under ASHRAE Standard 34.

New lower GWP refrigerants include, but are not limited to, refrigerants such as R-1234yf, R-1234ze, R-32, R-454A, R-454C, R-455A, R-447A, R-452B, and R-454B. These refrigerants have a Class A toxicity classification and a Class 2L flammability classification under ASHRAE Standard 34. These refrigerants may be referred to as A2L refrigerants. Because A2L refrigerants have the ability to propagate a flame, precautions must be taken to prevent the accidental build-up of A2L refrigerants, particularly in enclosed spaces. However, A2L refrigerants will not ignite if their concentration level is below their lower flammability limit. Thus, there is the need to provide apparatus, systems, and methods for detecting A2L refrigerant leaks and the build-up of A2L refrigerants in air conditioning and refrigeration systems.

SUMMARY

New and useful systems, apparatuses, and methods for a sensor are set forth in the appended claims. Illustrative embodiments are also provided to enable a person skilled in the art to make and use the claimed subject matter.

The present disclosure provides a sensor assembly that may include a controller, a sensor, and a housing enclosing the controller and the sensor. The housing includes a body supporting the controller and a head supporting the sensor. The body prevents exposure of the controller to an external environment and the head includes slots enabling exposure of the sensor to the external environment.

In some configurations of the sensor assembly of the above paragraph, the sensor includes a sensor chip configured to output sensor data.

In some configurations of the sensor assembly of either of the above paragraphs, the controller is configured to request and receive sensor data from the sensor chip.

In some configurations of the sensor assembly of any of the above paragraphs, the controller is configured to determine whether a condensation condition and whether a change in temperature threshold is met using the sensor data.

In some configurations of the sensor assembly of any of the above paragraphs, a heater is disposed within the housing, the heater being selectively powered ON to heat an interior space of the housing.

In some configurations of the sensor assembly of any of the above paragraphs, the controller is configured to power ON the heater when a condensation condition is met.

In some configurations of the sensor assembly of any of the above paragraphs, the controller is configured to power ON the heater when a change in temperature threshold is met.

The present disclosure provides a sensor assembly that may include a controller, a sensor, a housing and a heater. The sensor includes a sensor chip configured to output sensor data, and the sensor is electrically connected to the controller. The controller is configured to request and receive sensor data from the sensor chip and to determine from the sensor data whether a condensation condition is met. The housing has an interior space and encloses the controller and sensor. The housing has a first cavity supporting the controller and a second cavity supporting the sensor. The housing substantially prevents exposure of the controller to an external environment and includes one or more openings enabling exposure of the sensor to the external environment. The heater is disposed on the sensor and electrically connected to the controller. The controller is configured to selectively power the heater ON to heat at least a portion of the interior space of the housing when the condensation condition is met.

In some configurations of the sensor assembly of the above paragraph, the heater heats the second cavity when the condensation condition is met.

In some configurations of the sensor assembly of either of the above paragraphs, the opening is a slot sized to restrict foreign particulate materials from passing into the second cavity and to allow gaseous fluids to pass into the second cavity.

In some configurations of the sensor assembly of any of the above paragraphs, the opening is a membrane positioned to restrict foreign particulate materials from passing into the second cavity and to allow gaseous fluids to pass into the second cavity.

In some configurations of the sensor assembly of any of the above paragraphs, the sensor chip is configured to detect actual condensation in the sensor assembly.

In some configurations of the sensor assembly of any of the above paragraphs, the sensor chip is a relative humidity sensor configured to measure relative humidity in the sensor assembly.

In some configurations of the sensor assembly of any of the above paragraphs, the sensor chip is a temperature sensor configured to measure temperature in the sensor assembly.

In some configurations of the sensor assembly of any of the above paragraphs, the housing includes a body defining the first cavity and a head defining the second cavity. The one or more openings extend through the head.

In some configurations of the sensor assembly of any of the above paragraphs, a barrier is disposed within the interior space of the housing to separate and seal the first cavity from the second cavity.

The present disclosure provides a refrigerant sensor assembly that may include a main processing unit, a sensor, a housing, and at least one heater. The main processing unit comprises a first printed circuit board on which is disposed a controller. The sensor comprises a second printed circuit board on which is disposed an A2L sensor, a relative humidity sensor, and a temperature sensor. The sensor is electrically connected to the main processing unit and the controller is configured to communicate with the A2L sensor. The relative humidity sensor and the temperature sensor and receive sensor data. The housing has a body, a head, a cover and at least one tab projecting from the body. The housing defines an interior space comprising a body cavity and a head cavity, and a barrier is disposed between the body cavity and the head cavity. The main processing unit is disposed in the body cavity and the sensor is disposed in the head cavity. The cover isolates the interior space of the housing from an external environment and the barrier separates and seals the body cavity from the head cavity. The head comprises one or more openings exposing the head cavity to the external environment. The one or more openings are operable to restrict foreign particulate materials from passing through the head and into the head cavity and to allow gaseous fluids to pass through the head and into the head cavity. The controller is configured to determine a condensation condition within the housing. The heater is disposed within the housing and configured to heat the head cavity of the housing. The controller is configured to energize the heater when the controller determines a condensation condition is met.

In some configurations of the sensor assembly of the above paragraph, the sensor data includes a relative humidity measured by the relative humidity sensor, a temperature measured by the temperature sensor, and a detection of actual condensation present in the refrigerant sensor assembly.

In some configurations of the sensor assembly of either of the above paragraphs, a switch is in communication with the controller and configured to energize the heater when the condensation condition is met and de-energize the heater when the condensation condition is not met.

In some configurations of the sensor assembly of any of the above paragraphs, a connector is disposed on the first printed circuit board and a second opening extends through the body, wherein the second opening is aligned with the connector and positioned at an opposite end from the sensor.

Objectives, advantages, and a preferred mode of making and using the claimed subject matter may be understood best by reference to the accompanying drawings in conjunction with the following detailed description of illustrative embodiments.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings, as applicable.

DESCRIPTION

The following description of example embodiments provides information that enables a person skilled in the art to make and use the subject matter set forth in the appended claims, but it may omit certain details already well-known in the art. The following detailed description is, therefore, to be taken as illustrative and not limiting.

Figure 1:
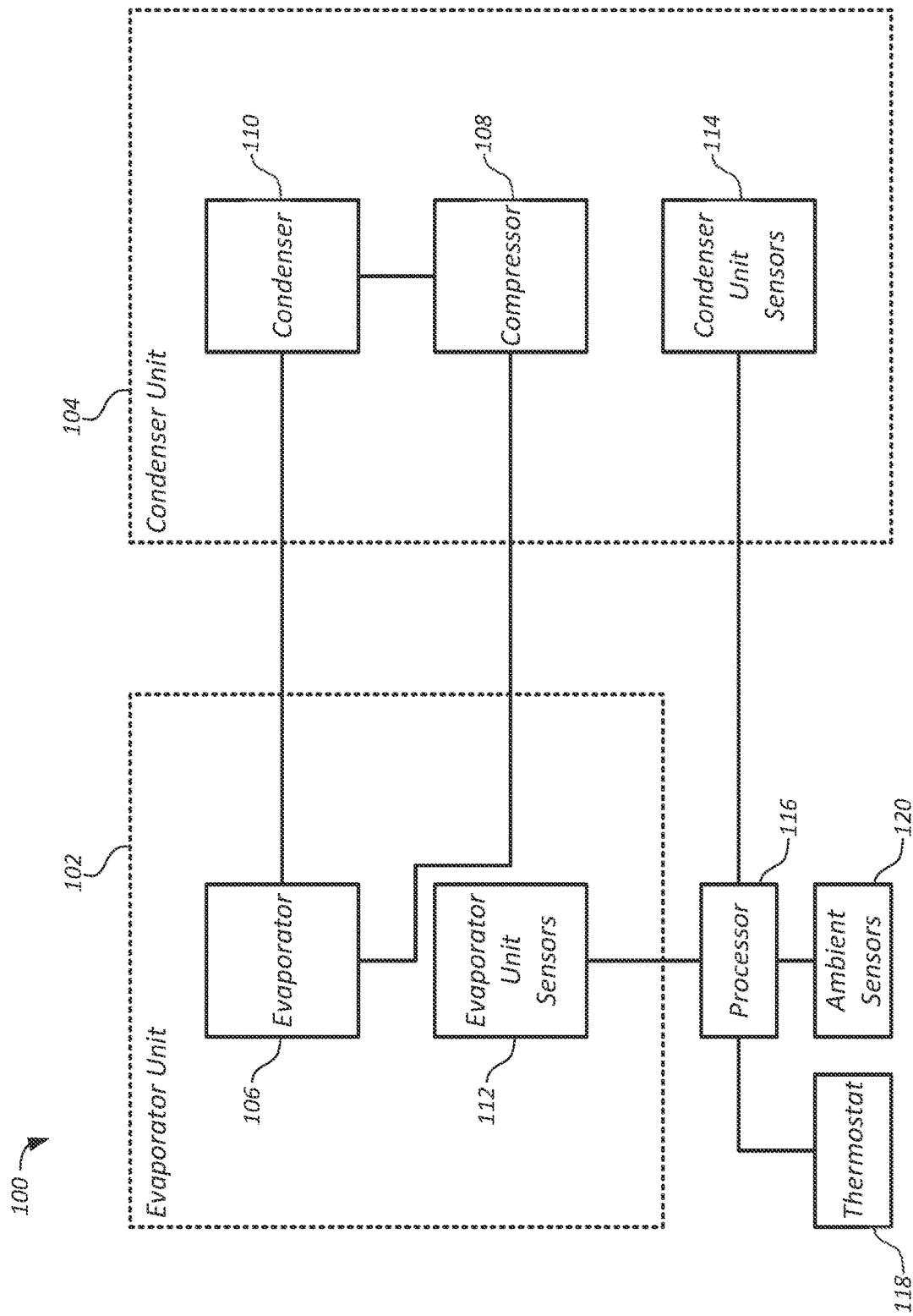
FIG. 1 is a functional block diagram of an example embodiment of a refrigeration cycle system used in heating, ventilation, and air conditioning systems.

FIG. 1 is a functional block diagram of an example embodiment of a refrigeration cycle system 100 used in heating, ventilation, and air conditioning (HVAC) systems. As shown in FIG. 1, some examples of the refrigeration cycle system 100 may include a refrigeration circuit including an evaporator unit 102 and a condenser unit 104. According to some examples, the evaporator unit 102 may be located indoors and referred to as an indoor unit, while the condenser unit 104 may be located outdoors and referred to as an outdoor unit. The evaporator unit 102 may include an evaporator 106, such as an evaporator coil, and the condenser unit 104 may include a compressor 108 and a condenser 110. The evaporator 106, compressor 108, and the condenser 110 may be fluidly coupled, such as by a pipe, gas line, or liquid line. For example, the evaporator 106 may be fluidly coupled to the compressor 108 by a suction line. In some examples, the evaporator 106 may be fluidly coupled to the condenser 110 by a liquid line. According to exemplary embodiments, the compressor 108 may be fluidly coupled to the condenser 110 by a hot gas line.

The refrigeration cycle system 100 may circulate a working fluid within the refrigeration circuit. The working fluid may contain a refrigerant, such as an air-to-liquid (A2L) refrigerant. For example, the A2L refrigerant may include R-1234yf, R-1234ze, R-32, R-454A, R-454C, R-455A, R-447A, R-452B, or R-454B. Alternatively, the working fluid may be water.

In operation, the compressor 108 may receive the working fluid through a suction port, compress the working fluid, and discharge the compressed working fluid through a discharge port. After the working fluid is compressed by the compressor 108, the working fluid gas be provided to the condenser 110 in a gas form through the hot gas line. The condenser 110 cools the working fluid, which condenses back into liquid form. The working fluid may be transported from the condenser 110 to the evaporator 106 through the liquid line. At the evaporator 106, heat is absorbed by the working fluid, causing the working fluid to expand into a gas or liquid-gas mixture. As a result of the working fluid's phase change from liquid into gas in the evaporator 106, the temperature of the working fluid is decreased, and the cooled gas may absorb heat energy from the evaporator 106, cooling the exterior of the evaporator 106 in the process. A fan (not shown) may provide airflow over the cooled exterior of the evaporator 106. As the air flows over the cooled exterior of the evaporator 106, the evaporator 106 may absorb heat energy from the flowing air, cooling the air. This cooled air may then be provided via ductwork to an air conditioned environment, such as the interior of a room within a building.

The refrigeration cycle system 100 may also include various monitoring and control means, such as sensors, thermostats, and processors. For example, evaporator unit sensors 112 may be provided within a housing member of the evaporator unit 102, and condenser unit sensors 114 may be provided within a housing member of the condenser unit 104. The evaporator unit sensors 112 and condenser unit sensors 114 may be operatively coupled to a controller 116 (e.g., a processor). In some examples, a thermostat 118 may be provided to monitor the air conditioned environment. The thermostat 118 may also be operatively coupled to the controller 116. In illustrative embodiments, additional ambient sensors 120 may also be provided and operatively coupled to the controller 116.

Figure 2:
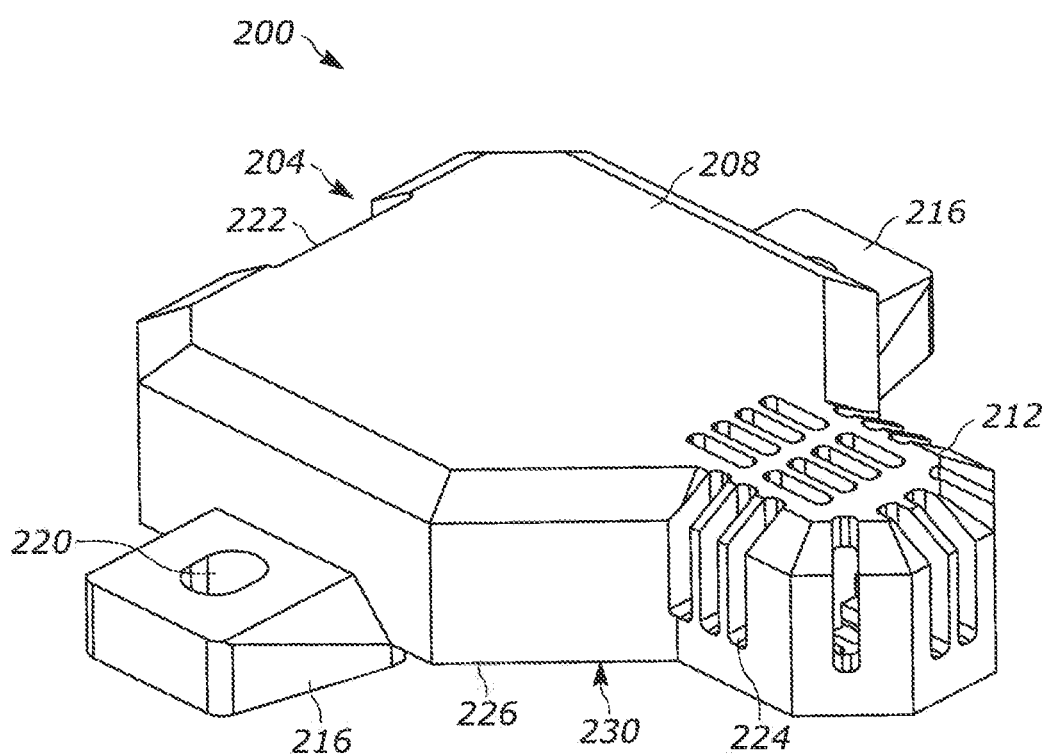
FIG. 2 is a front perspective view of an example sensor assembly disposed in the refrigeration cycle system of FIG. 1.
Figure 3:
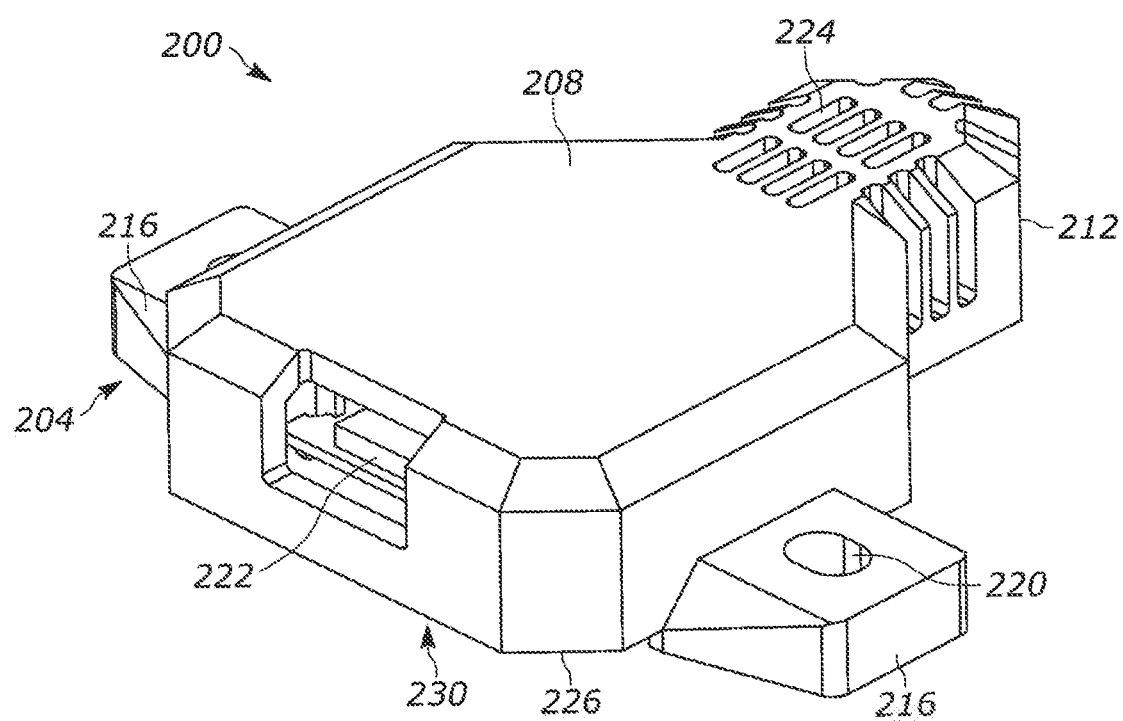
FIG. 3 is a back perspective view of the sensor assembly of FIG. 2.
Figure 4:
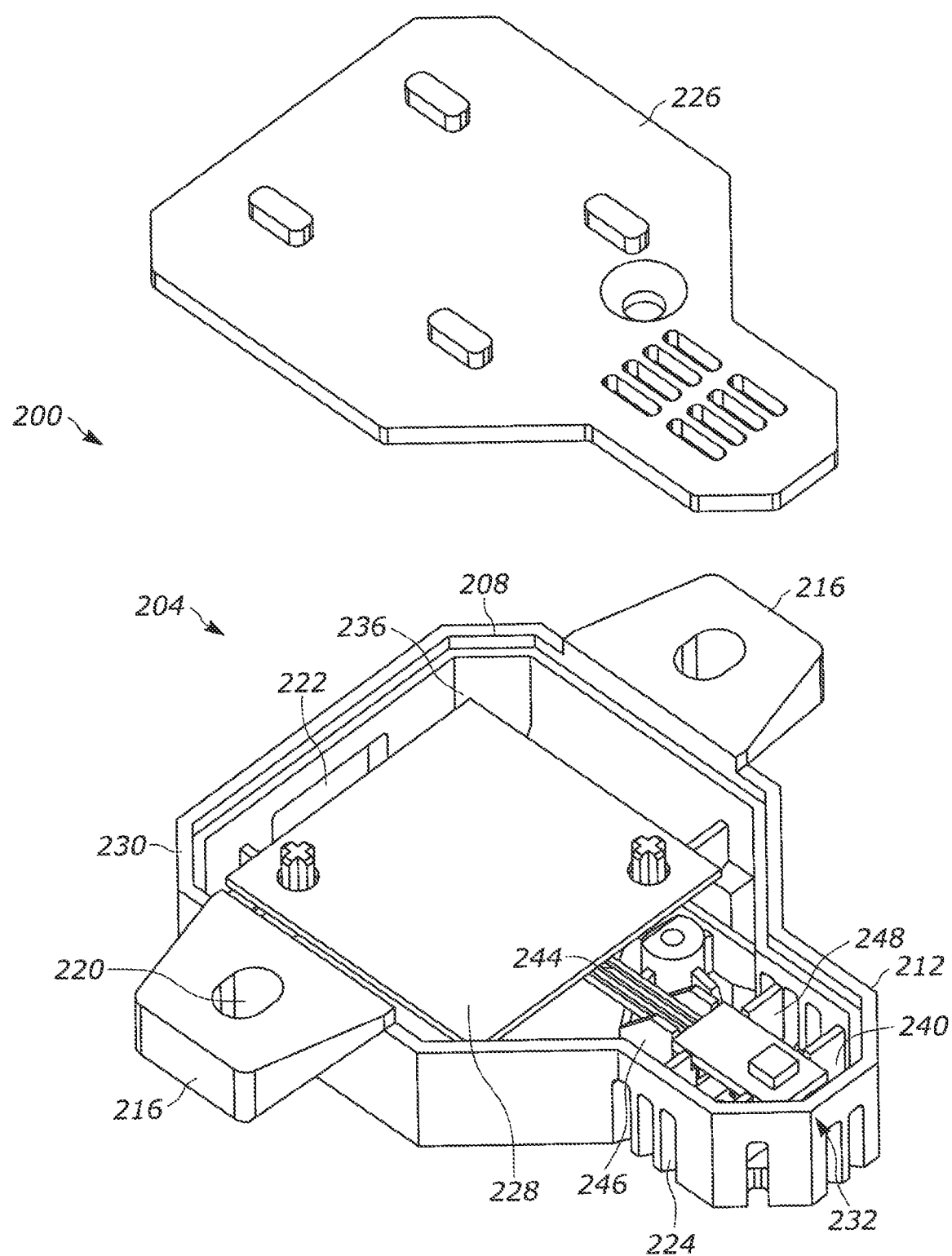
FIG. 4 is a bottom perspective view of the sensor assembly of FIG. 2 with a cover exploded.

Now referring to FIGS. 2 to 4, an example sensor assembly 200 is illustrated. The sensor assembly 200 may be an example sensor of the evaporator unit sensors 112, an example sensor of the condenser unit sensors 114, or an example thermostat 118, as previously described. The sensor assembly 200 may be a gas sensor, such as an A2L refrigerant sensor or other gas sensor. For example, the sensor assembly 200 may be disposed in or near the evaporator coil and may sense the presence or accumulation of the working fluid (for example, in a gaseous state), and particularly the A2L refrigerant, outside of the refrigeration circuit.

The sensor assembly 200 may include a housing 204 that encases an electronics package and at least one sensing element, described below. The housing 204 may be composed of a plastic, or any other suitable material. The housing may be injection molded or formed in another suitable manner. The housing 204 may include a body 208, a head 212, and one or more tabs 216. The body 208, head 212, and tabs 216 may form a single, integral, monolithic part. The head 212 may project from the body 208 and house the sensing portion. The tabs 216 may project from the body 208 and may include apertures 220 for mounting or fixing the housing 204 to a support structure in the refrigeration cycle system 100.

The structure of the housing 204 may allow the sensor assembly 200 be positioned in a harsh environment, for example the evaporator coil. The body 208 for the housing 204 may be solid for protecting the sensor electronics package, including a first printed circuit board (or a main processing board), described below. The housing 204 may define an opening 222 on a side of the body 208 for attachment to a connector (described below) housed within the body 208. For example, the opening 222 may be disposed on a side of the housing 204 opposite the head 212 to position the opening farthest from the environment in which the head 212 is positioned. In some examples, the head 212 of the housing 204 may be positioned in a harsh environment while the body 208 is in a space sheltered from the environment. By positioning the opening 222 farthest from the head 212, the opening 222 is positioned farthest from the harsh environment as well.

Figure 8:
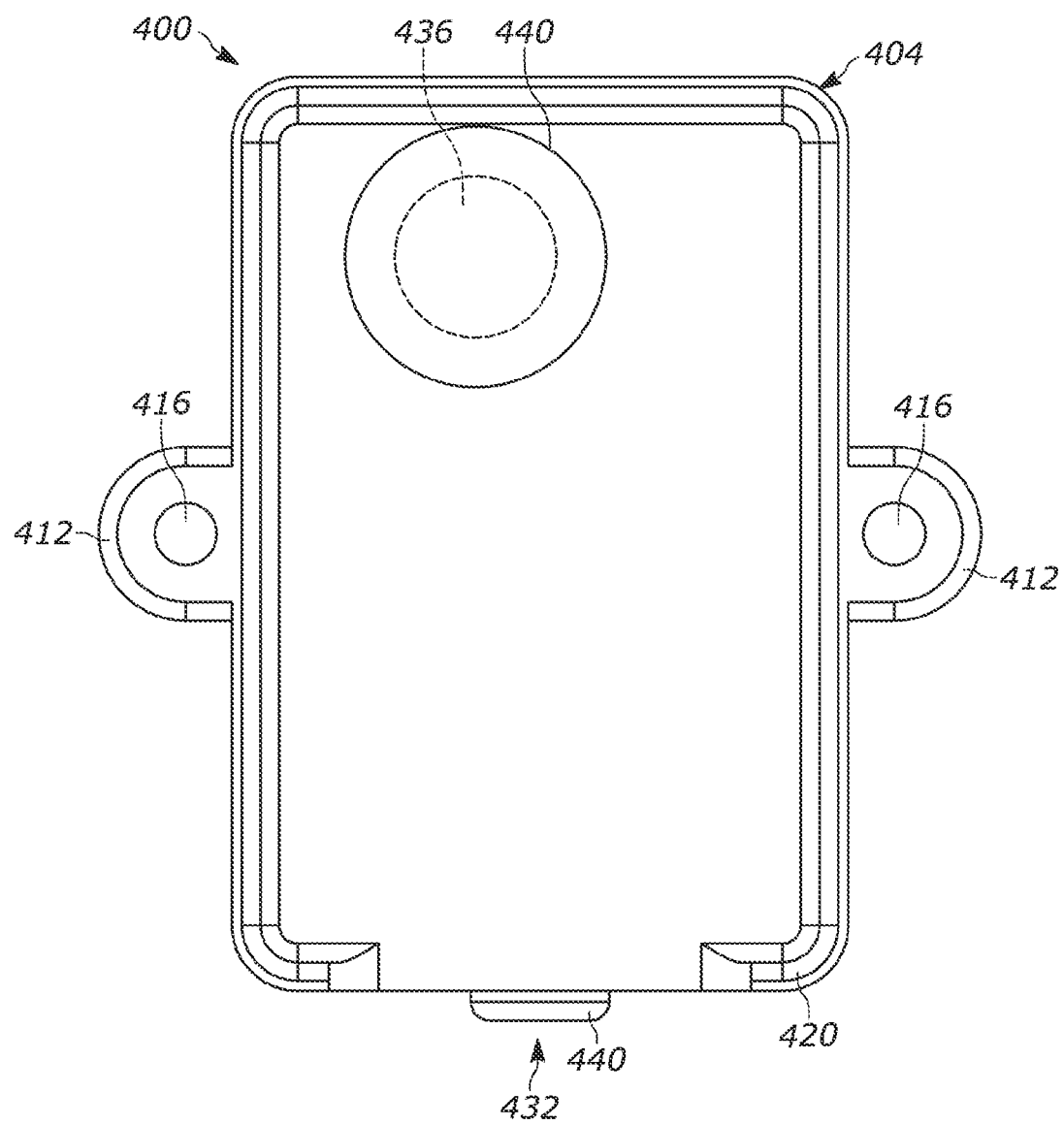
FIG. 8 is a top view of the sensor assembly of FIG. 7.

The housing 204 may include a plurality of slots 224 or other openings formed on the head 212. The slotted head 212 allows the sensing element, described below, to be exposed to the environment for sensing. The slots 224 may be sized such that they minimize or prohibit foreign particulate materials including dirt, condensation, lint, oil, etc. from passing through the head 212 and sensor element, but such that water vapor (or working fluid vapor) is allowed to pass through. The head 212 may include a filter or filter membrane (e.g. membrane 440 as shown in FIG. 8) positioned on an inside surface of the head 212 adjacent the slots 224 to provide additional filtering for undesirable particles or contaminants.

The housing 204 may include a cover or lid 226 on a base 230 of the housing 204 that provides access to an interior space of the housing 204. The cover 226 may provide a seal at an interface of the cover 226 with the housing 204 such that the cover 226 isolates the interior space from the environment.

The housing 204 may encase and support an electronics package including a main processing unit 228 and a sensor 232 that are separately located within the housing 204. For example, the main processing unit 228 may be disposed within a cavity 236 defined by the body 208, and the sensor 232 may be disposed within a cavity 240 defined by the head 212. The main processing unit 228 may be electrically connected to the sensor 232 by one or more wires 244. For example, the wires 244 may include a ribbon cable.

One or more barriers 246 may be disposed on opposing sides of the wires 244. The barriers 246 may provide sealing and/or may separate the cavity 236 (e.g., body cavity, first cavity) of the body 208 from the cavity 240 (e.g., head cavity, second cavity) of the head 212. The barriers 246 may be projections integral with the housing 204.

A vent 248, or gap, may be formed around a perimeter of the sensor 232 to space the sensor 232 from the housing 204. For example, projections, similar to the barriers 246 may be formed integral with the housing 204 and positioned around the perimeter of the sensor 232 to support the sensor 232 and space the sensor 232 from the housing 204 creating the vent 248. For example, the vent 248 may be within a range of 1-8 mm in depth, and more specifically about 5 mm.

Figure 5:
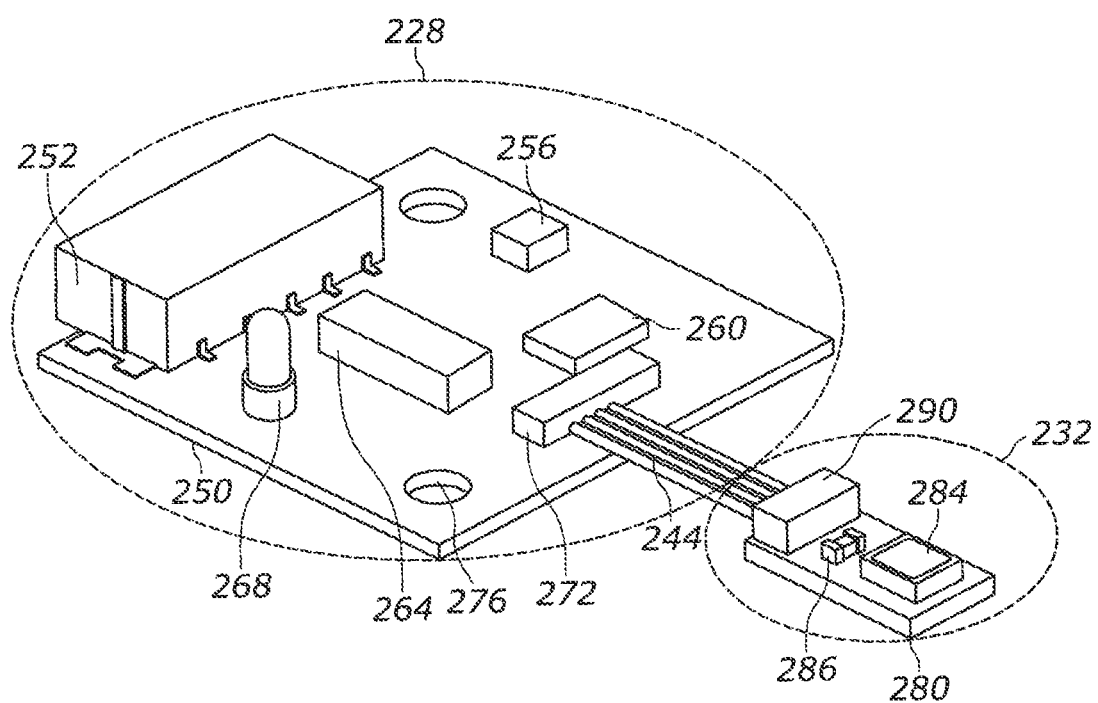
FIG. 5 is a perspective view of an electronics package for the sensor assembly of FIG. 3, including a processor and a sensor.

FIG. 5 illustrates the main processing unit 228 and sensor 232 assembly outside of the housing 204. The main processing unit 228 may include a first printed circuit board 250 (e.g., a motherboard), on which a connector 252 (e.g., a pin connector), a voltage regulator 256, a controller 260 (e.g., a microprocessor or microcontroller), a signal conditioner 264, a signal light 268 (e.g., a light-emitting diode, LED), and a sensor connector 272 may be mounted. The first printed circuit board 250 may be sized to fit within the cavity 236 defined by the body 208. For example, the first printed circuit board 250 may be within a range of 23-27 millimeters (mm), and more specifically 25 mm, in width, within a range of 23-27 mm, and more specifically 25 mm, in length, and within a range of 0.5-2.0 mm, and more specifically 1 mm, in height. The first printed circuit board 250 may include one or more apertures 276 for mounting the main processing unit 228 within the housing 204.

The connector 252 may be a universal serial bus (USB) to serial (such as transistor-transistor logic, TTL interface) converter (for example, a Future Technology Devices International™, FTDI™) connector configured to receive a cable and transmit a sensor output from the sensor assembly 200. The connector 252 may be positioned on an end of the first printed circuit board 250 such that the connector 252 aligns with the opening 222 in the body 208 of the housing (FIG. 3).

The controller 260 may communicate with the sensor 232 through the sensor connector 272, the voltage regulator 256, the signal conditioner 264, and the signal light 268 to control the various functions of the sensor assembly 200. The controller 260 may transmit the sensor output though the connector 252. Wiring may transmit the sensor output from the connector 252 to various external controllers.

Figure 9:
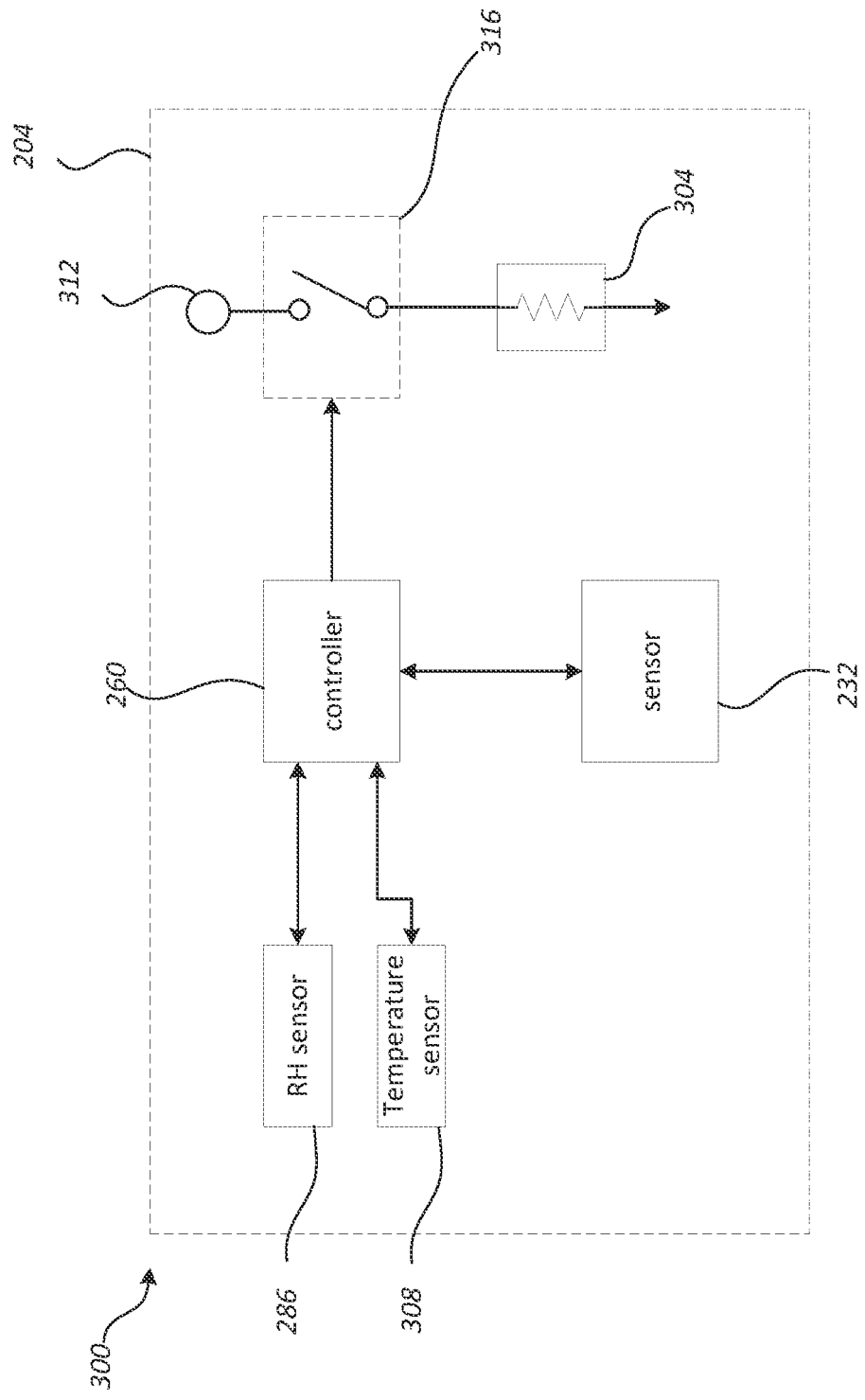
FIG. 9 is a functional block diagram of the sensor assembly in FIG. 6.

The sensor 232 may include a second printed circuit board 280 (e.g, a sensor board) on which one or more sensor chips 284, 286 and a connector 290 may be mounted. The connector 290 may connect to the sensor connector 272 through wiring 244. The sensor chips 284, 286, for example, may include an A2L sensor chip 284 and a relative humidity (RH) sensor chip 286. The second printed circuit board 280 may also optionally include a temperature sensor chip (e.g., temperature sensor chip 308 as shown in FIG. 9). The second printed circuit board 280 may be sized to fit within the cavity 240 defined by the head 212. For example, the second printed circuit board 280 may be within a range of 4-7 millimeters (mm), and more specifically 5-6 mm, in width, within a range of 9-12 mm, and more specifically 10-11 mm, in length, and within a range of 0.5-2.0 mm, and more specifically 1 mm, in height.

Figure 6:
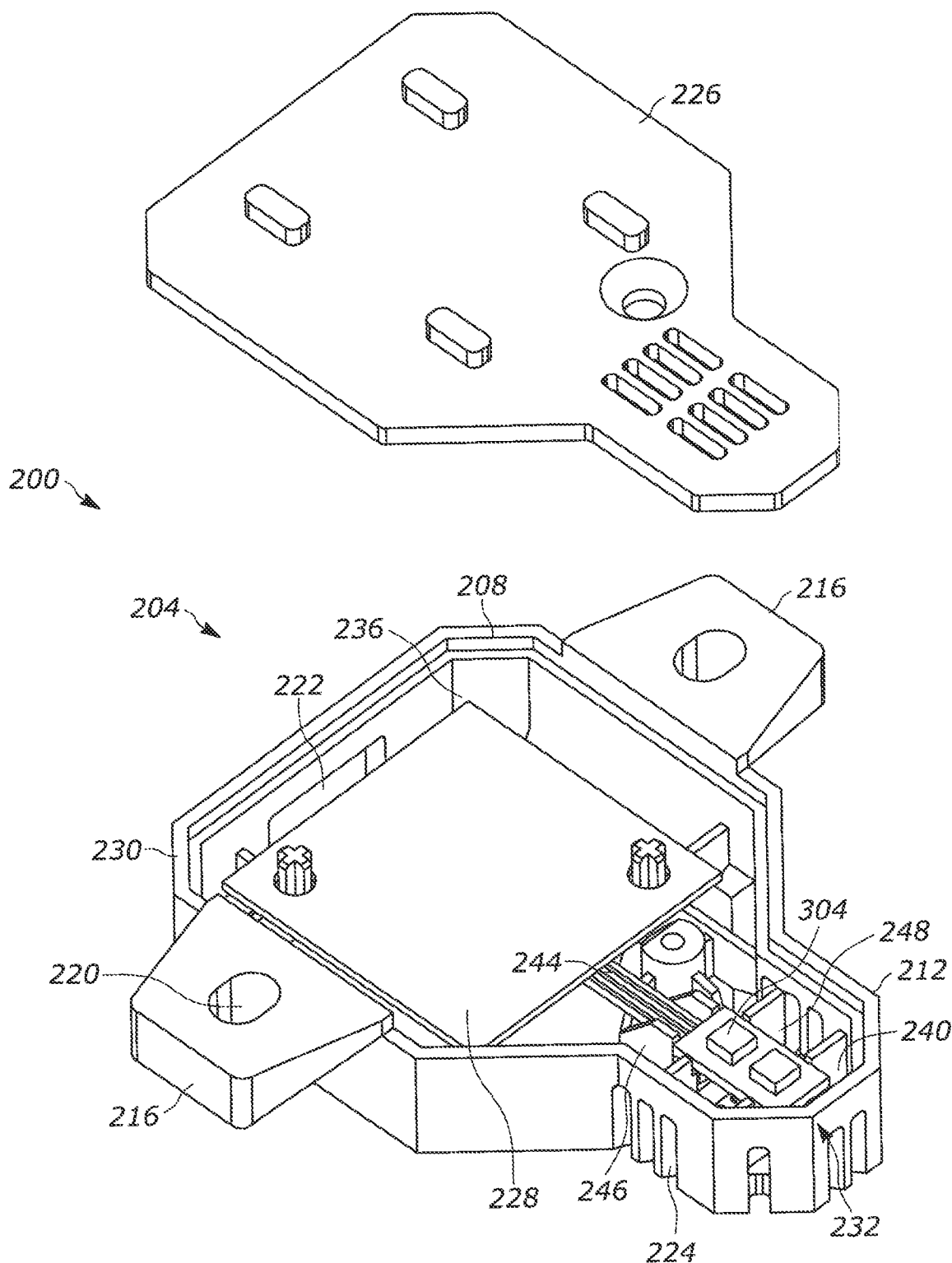
FIG. 6 is a perspective view of another example sensor assembly disposed in the refrigeration cycle system of FIG. 1.

Referring to FIG. 6, a sensor assembly 300 is illustrated. The sensor assembly 300 is the same as sensor assembly 200, except that sensor assembly 300 includes an internal heater 304. Like numbers indicate the same parts between sensor assembly 200 and sensor assembly 300 and will, therefore, not be described.

As shown in FIG. 6, for example, the heater 304 may be disposed on the sensor 232. Alternatively, for example, the heater 304 may be disposed on the main processing unit 228. Alternatively, for example, the heater 304 may be a plurality of heaters, with at least one heater positioned on the main processing unit 228 and at least one heater positioned on the sensor 232.

The heater 304 may mitigate condensing moisture within the cavity 236 and/or the cavity 240. Typical condensing of RH may occur in colder temperatures, for example ambient air temperatures less than 25° C. During the summer, water may build in the evaporator coil because the coil temperature is less than a dew point temperature of the inlet air. When a sensor, such as sensor assembly 300 is attached to the evaporator coil assembly, water may build within the cavities 236, 240 for at least the same reasons. The heater 304 may mitigate the condensing moisture by internally heating the sensor electronics to keep the sensor temperature from dropping below the inlet air dew point temperature.

A selectively controlled heater, as opposed to constant internal heating, is optimal because the heater 304 may be configured to shut off during the winter when the air temperature in the evaporator is much higher (for example, the air temperature in the duct work may be 74° C.). For example, the heater 304 may be selectively shut off to prevent the sensor temperature increasing above a threshold level (for example only, above 100° C.).

Figure 7:
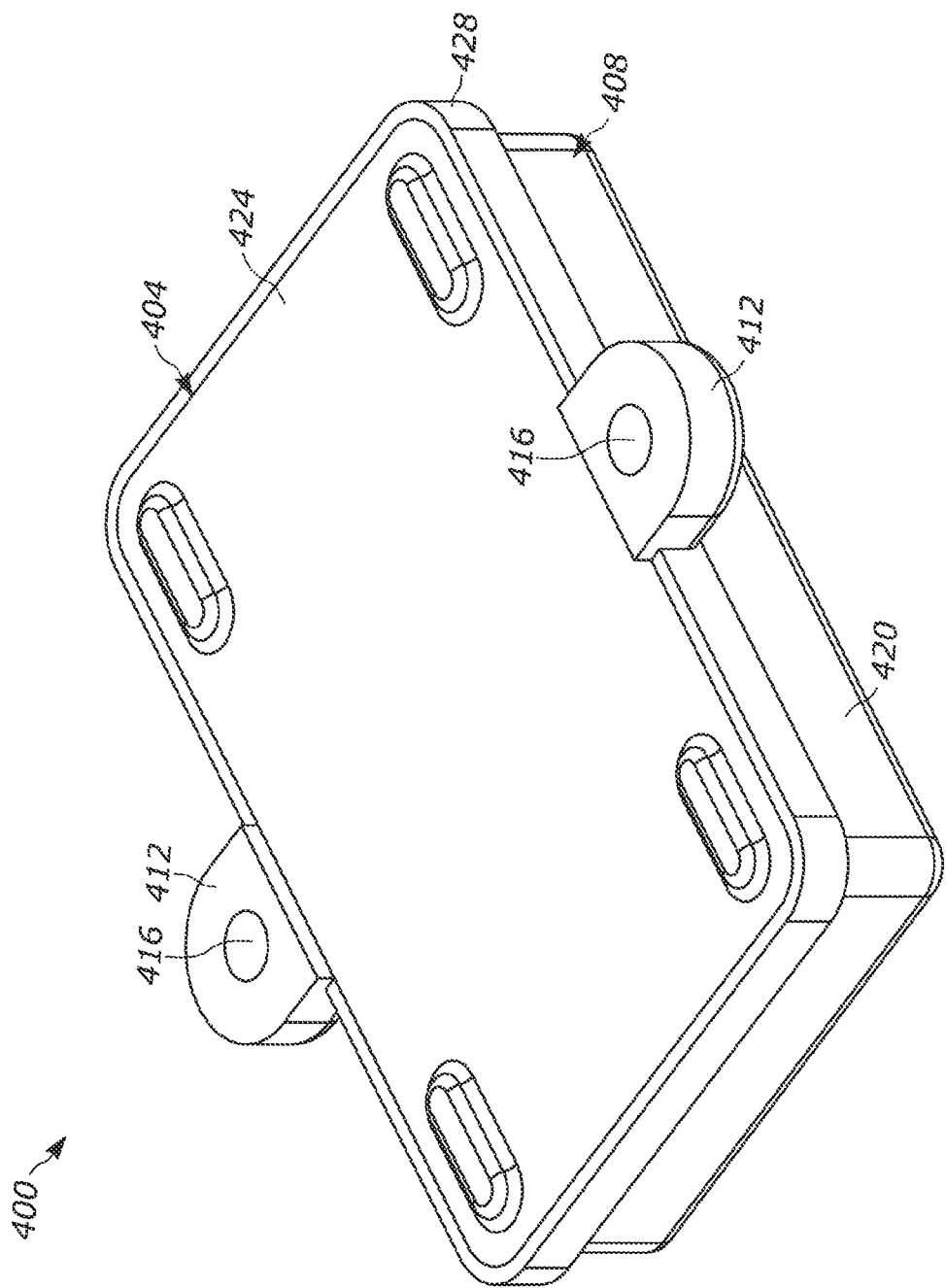
FIG. 7 is a perspective view of another example sensor assembly disposed in the refrigeration cycle system of FIG. 1.

Now referring to FIGS. 7 and 8, an alternative example of a sensor assembly 400 is illustrated. The sensor assembly 400 may include all of the parts and electronics of sensor assembly 200 packaged in a different housing. Sensor assembly 400 may include a housing 404 that encases an electronics package and at least one sensing element. The housing 404 may include a body 408 and one or more tabs 412. The body 408 and tabs 412 may form a single, integral, monolithic part. The tabs 412 may project from the body 408 and may include apertures 416 for mounting or fixing the housing 404 to a support structure in the refrigeration cycle system 100.

The body 408 may be a two-piece body having a base 420 and a cover 424. The base 420 may be formed integrally, and monolithically with the tabs 412. The base 420 may define a recess or cavity for housing the electronic parts, as previously mentioned. The base 420 may be composed of plastic, metal, or any other suitable material. The base 420 may be injection molded or formed in another suitable manner.

The cover 424 may seal and isolate the recess or cavity formed by the base 420 from the environment. The cover 424 may fit within a stepped portion 428 of the base 420 such that the cover 424 is flush with a perimeter of the base 420. The cover 424 may be composed of an elastomer, a plastic, or another sealing material. The cover 424 may be formed by injection molding or another suitable manner.

The structure of the housing 404 may allow the sensor assembly 400 to be positioned in a harsh environment, for example the evaporator coil. The body 408 for the housing 404 may be solid for protecting the sensor electronics package, including a main processing board. The housing 404 may define an opening 432 on a side of the body 408 for attachment to a connector housed within the body 408. For example, the opening 432 may be disposed on a side of the housing 404 opposite placement of a sensor 436 in the body 408 (FIG. 8) to position the opening farthest from the environment in which the sensor 436 is positioned. In some examples, the portion of the housing 404 having the sensor 436 may be positioned in a harsh environment while the opening 432 in the body 408 is in a space sheltered from the environment. By positioning the opening 432 farthest from the sensor 436 portion of the body 408, the opening 432 is positioned farthest from the harsh environment as well.

The housing 404 may include one or more barriers (e.g. barriers 246 as shown in FIG. 4). The barriers may provide sealing and/or may separate the body 408 into a first cavity (e.g., cavity 236 as shown in FIG. 4) housing the electronics package and a second cavity (e.g., cavity 240 as shown in FIG. 4) housing the sensor 436. The barriers may be projections integral with the housing.

The housing 404 may include one or more membranes 440, or other openings, that minimize or prohibit foreign particulate materials including dirt, condensation, lint, oil, etc. from the harsh environment from entering the space within the housing 404. The membrane 440 may be gas permeable. The membrane 440 may be formed of an elastomer or other suitable material for sealing the opening 432. The membrane 440 may be positioned at the opening 432 to prevent foreign particulate materials into the first cavity via the opening 432. Another membrane 440 may be positioned within the base 420 and aligned with the sensor 436 to prevent foreign particulate materials into the second cavity, but still allow the sensor 436 to be exposed to the environment for sensing.

Now referring to FIG. 9, a functional block diagram of the sensor assembly 300 is illustrated. The sensor assembly 300 includes the housing 204 that encloses the controller 260, the RH sensor chip 286, the A2L sensor chip 284, a temperature sensor chip 308, a power source 312, a relay or switch 316, and the heater 304. While illustrated as separate, the RH sensor chip 286 and temperature sensor chip 308 may be mounted with the A2L sensor chip 284 on a second printed circuit board 280. Alternatively, the RH sensor chip 286 and the temperature sensor chip 308 may be included in a condensation detection circuit that includes various sensors providing outputs for determining condensation.

The controller 260 may be configured to request and receive sensor data from the RH sensor chip 286, the temperature sensor chip 308 and/or the A2L sensor chip 284. More specifically, the sensor data may include output signals from one or both of the RH sensor 286 and the temperature sensor 308, or alternatively, the condensation detection circuit. The sensor data may further include an output from the A2L sensor chip 284.

The controller 260 may process the sensor data to transmit the sensor output through the connector 252 and/or actuation of the signal light 268. Additionally, the controller 260, using the sensor data, may determine whether a condensation condition is met within the sensor assembly 300. The condensation condition may be met upon reaching a threshold value, such as a temperature threshold value, a RH threshold value, or a combination of both. Alternatively, the condensation condition may be met when actual condensation is detected in the sensor assembly 300.

In one example, the condensation condition is met if the RH is high, such as greater than a RH threshold value (for example, above 25% to 35% RH), and the temperature is low, such as less than the temperature threshold value (for example, less than −23° C. to −7° C.). This is because excess water vapor will condense when the temperature of the air decreases since cold air holds less water vapor than warm air. More specifically, saturation (for example, 100% relative humidity) occurs when the temperature of the air drops below the dew point temperature.

In another example, the condensation condition is met if the RH alone is greater than another RH threshold value (for example, greater than 50% to 75% RH or more). In this case, the controller 260 may determine that there is actual condensation in the sensor assembly 300. Alternatively, the sensor assembly 300 may include a condensation sensor that detects where there is actual condensation in the sensor assembly 300. Alternatively, the controller 260 may determine actual condensation in the sensor assembly 300 using any available method.

The controller 260 may be in communication with the switch 316 and may be configured to energize the switch 316 to connect the power source 312 to the heater 304. Based on whether a condensation condition is met, the controller 260 may actuate, or energize, the switch 316 to supply power from the power source 312 to the heater 304 to heat the cavities 236, 240 in the housing 204 and keep the main processing unit 228 and sensor 232 free of moisture. For example, this scenario is typical of summer operation.

Based on the controller 260 determining that a condensation condition is not met, there is not condensation in the sensor assembly 300, the controller 260 may de-energize the switch 316 to break the connection between the power source 312 and the heater 304, shutting off the heater 304. For example, this scenario is typical of winter operation.

In addition to, or alternative to, the controller 260 actuating the heater 304 to mitigate condensation in the sensor assembly 300, the controller 260 may actuate the heater 304 to reduce temperature swing of the air within the sensor assembly 300 to improve measurement accuracy of the sensor. For example, if a change in temperature (ΔT) from the temperature sensor chip 308 is greater than a change in temperature threshold (for example, greater than 1° C. per minute), the controller 260 may actuate, or energize, the switch 316 to supply power from the power source 312 to the heater 304 to heat the cavities 236, 240 in the housing 204. When the change in temperature (ΔT) from the temperature sensor chip 308 drops below the change in temperature threshold, the controller 260 may de-energize the switch 316 to break the connection between the power source 312 and the heater 304, shutting off the heater 304.

While shown in a few illustrative embodiments, a person having ordinary skill in the art will recognize that the systems, apparatuses, and methods described herein are susceptible to various changes and modifications that fall within the scope of the appended claims. Moreover, descriptions of various alternatives using terms such as "or" do not require mutual exclusivity unless clearly required by the context, and the indefinite articles "a" or "an" do not limit the subject to a single instance unless clearly required by the context. Components may be also be combined or eliminated in various configurations for purposes of sale, manufacture, assembly, or use.

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described in the context of some embodiments may also be omitted, combined, or replaced by alternative features serving the same, equivalent, or similar purpose without departing from the scope of the invention defined by the appended claims.

What is claimed is:

1. A sensor assembly comprising:
   a controller;
   a sensor comprising a refrigerant gas sensor and at least one of a relative humidity sensor configured to measure relative humidity in the sensor assembly, a temperature sensor configured to measure temperature in the sensor assembly and a condensation detection circuit configured to detect actual condensation in the sensor assembly, the sensor configured to output sensor data, the sensor being electrically connected to the controller;
   wherein the controller is configured to request and receive the sensor data from the sensor and to determine from the sensor data whether a condensation condition is met;

a housing having an interior space and enclosing the controller and the sensor, the housing having a first cavity supporting the controller and a second cavity supporting the sensor, wherein the housing substantially prevents the controller from being exposed to an external environment, and wherein the housing includes at least one opening that enables the sensor to be exposed to the external environment; and a heater disposed in the interior space of the housing and electrically connected to the controller;

wherein, the controller is configured to power ON the heater to heat at least a portion of the interior space of the housing responsive to a determination that the condensation condition is met.

2. The sensor assembly of claim 1, wherein the heater heats the second cavity when the condensation condition is met.

3. The sensor assembly of claim 1, wherein the at least one opening is a slot sized to restrict foreign particulate materials from passing into the second cavity and to allow gaseous fluids to pass into the second cavity.

4. The sensor assembly of claim 1, wherein the at least one opening is a membrane positioned to restrict foreign particulate materials from passing into the second cavity and to allow gaseous fluids to pass into the second cavity.

5. The sensor assembly of claim 1, wherein the housing comprises a body defining the first cavity and a head defining the second cavity; and wherein the at least one opening extends through the head.

6. The sensor assembly of claim 1, further comprising a barrier disposed within the interior space of the housing and that separates and seals the first cavity from the second cavity.

7. The sensor assembly of claim 1, wherein the controller is configured to power OFF the heater responsive to a determination that the condensation condition is not met;

wherein the controller is configured to determine a rate of change of temperature in the interior space of the housing; and wherein the controller is configured to power OFF the heater when a value of the rate of change of temperature in the interior space of the housing is less than a threshold and to power ON the heater when the value of the rate of change of temperature in the interior space of the housing is greater than the threshold.

8. A refrigerant sensor assembly comprising:

a main processing unit comprising a first printed circuit board on which is disposed a controller;

a sensor comprising a second printed circuit board on which is disposed an A2L sensor, a relative humidity sensor, and a temperature sensor, wherein the sensor is electrically connected to the main processing unit and the controller is configured to communicate with the A2L sensor, the relative humidity sensor and the temperature sensor and receive sensor data;

a housing having a body, a head, a cover and at least one tab projecting from the body, the housing defining an interior space comprising a body cavity and a head cavity, and a barrier disposed between the body cavity and the head cavity;

wherein the main processing unit is disposed in the body cavity and the sensor is disposed in the head cavity;

wherein the cover isolates the interior space of the housing from an external environment and wherein the barrier separates and seals the body cavity from the head cavity;

wherein the head comprises one or more openings exposing the head cavity to the external environment, wherein the one or more openings are operable to restrict foreign particulate materials from passing through the head and into the head cavity and to allow gaseous fluids to pass through the head and into the head cavity;

wherein the controller is configured to determine whether a condensation condition within the housing is met;

wherein the controller is configured to determine a value of a change of temperature within the housing;

at least one heater disposed within the housing and configured to heat at least one of the head cavity of the housing and the body cavity of the housing; and wherein the controller is configured to power ON the heater when the controller determines the condensation condition within the housing is met and power OFF the heater when the controller determines the condensation condition within the housing is not met;

wherein the controller is configured to power OFF the heater when the value of the change of temperature within the housing is less than a threshold and power ON the heater when the value of the change of temperature within the housing is greater than the threshold.

9. The refrigerant sensor assembly of claim 8, wherein the sensor data includes a relative humidity measured by the relative humidity sensor, a temperature measured by the temperature sensor, and a detection of actual condensation present in the refrigerant sensor assembly.

10. The refrigerant sensor assembly of claim 8, further comprising:

a power source;

a switch in communication with the controller and electrically connecting the power source to the heater;

wherein the controller is configured to close the switch when the condensation condition within the housing is met and open the switch when the condensation condition within the housing is not met; and wherein the controller is configured to open the switch when the value of the change of temperature is less than the threshold and close the switch when the value of the change of temperature is greater than the threshold.

11. The refrigerant sensor assembly of claim 8, further comprising a connector disposed on the first printed circuit board and a second opening extending through the body, wherein the second opening is aligned with the connector and positioned at an opposite end from the sensor.

* * * * *